Jan. 27, 1925.  
N. E. MANN  
ELECTRIC TOASTER  
Filed June 10, 1924  
1,524,193
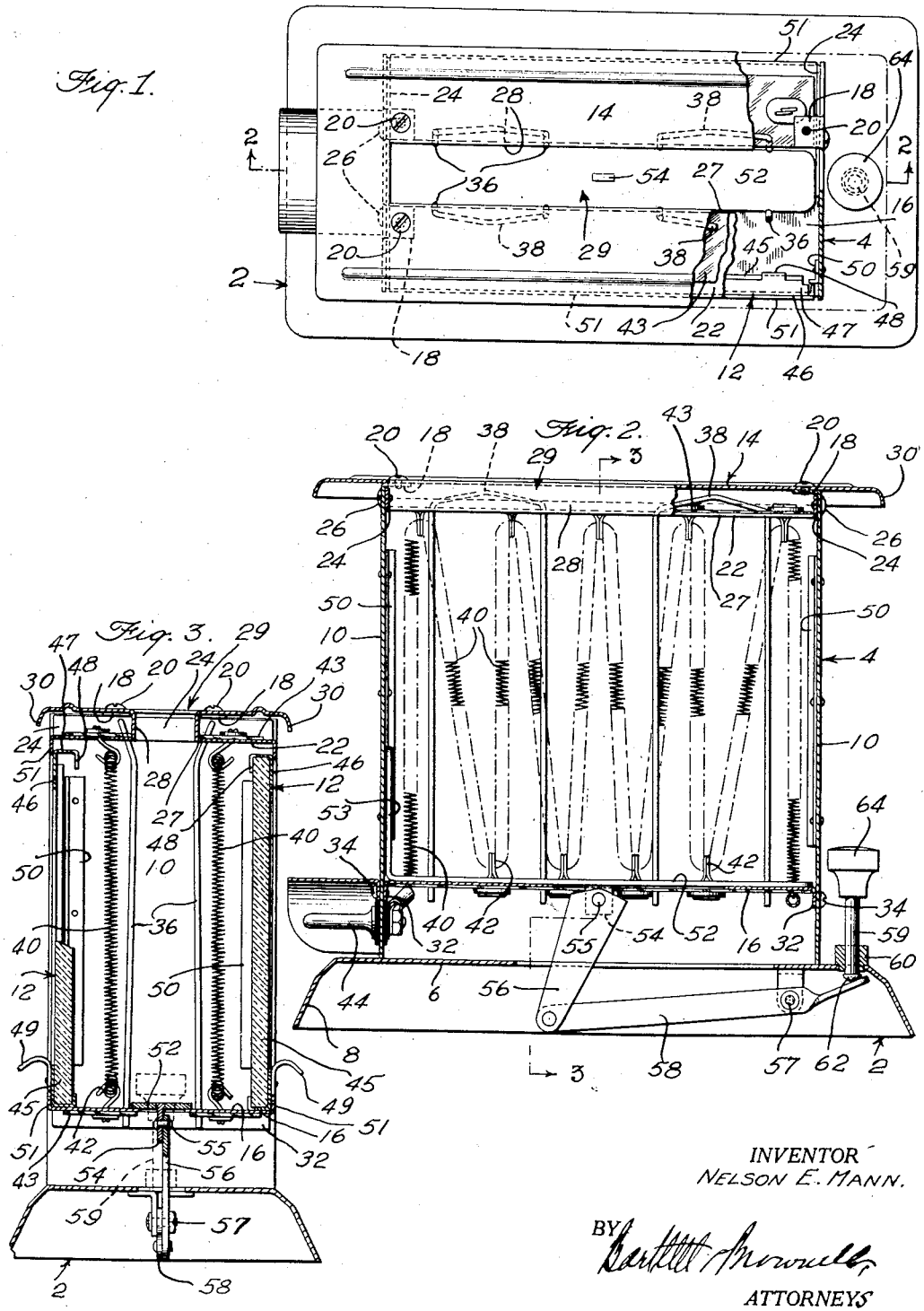
INVENTOR  
NELSON E. MANN.  
BY Bartlett Morrill  
ATTORNEYS Patented Jan. 27, 1925.

1,524,193

UNITED STATES PATENT OFFICE.

NELSON E. MANN, OF NEWINGTON, CONNECTICUT, ASSIGNOR TO MANNING, BOWMAN & COMPANY, OF MERIDEN, CONNECTICUT, A CORPORATION OF CONNECTICUT.

ELECTRIC TOASTER.

Application filed June 10, 1924. Serial No. 719,027.

*To all whom it may concern:*

Be it known that I, NELSON E. MANN, a citizen of the United States, residing at Newington, county of Hartford, State of Connecticut, have invented a certain new and useful Improvement in Electric Toasters, of which the following is a full, clear, and exact description.

My invention relates to electric toasters and has special reference to electric bread toasters of the oven type.

An object of the invention is to provide a toaster of this character which is of simple, strong and durable construction and highly efficient.

Another object of the invention is to provide means in an electric toaster for ejecting or removing the toast, which consists of but few parts and which may be easily operated.

Another object of the invention is to provide an electric bread toaster of the closed oven type which is so constructed that the interior thereof is easily accessible for repair and cleaning purposes.

The several features of the invention, whereby the above mentioned and other objects may be attained, will be clearly understood from the following description and accompanying drawings, in which, Figure 1 is a top plan view, partly broken away, of an electric toaster embodying the features of the invention in their preferred form;

Fig. 2 is a vertical sectional view, partly in elevation, taken on the line 2—2 of Fig. 1; and Fig. 3 is a sectional view taken on the line 3—3 of Fig. 2.

The toaster illustrated in the drawings is provided with a casing having a base 2 and an oven 4. The base 2 is made of sheet metal and is provided with a top wall 6 having a depending flange forming a side wall 8. The oven 4 is provided with end walls 10, side walls 12, a top 14 and a bottom 16. The end walls 10 are made of sheet metal and have their lower ends supported by and suitably secured to the top of the base 2, and their upper ends have inwardly extending lugs 18 to which the top wall 14 is secured by means of screws 20. The upper ends of the end walls 10 are connected by a plate 22 having its ends turned upwardly at right angles forming flanges 24 that are secured to the end walls by screws 26. The plate 22 is provided with a central longitudinally extending slot 27 and the top wall 14 is provided with a similar slot 29 having depending flanges 28 on its longitudinal edges, the lower ends of which extend between the side walls of the slot 27. The slots 27 and 29 provide an opening through which a slice of bread may be inserted in and removed from the toaster oven. The top wall 14 is further provided with a depending marginal flange 30. The bottom 16 of the oven comprises a plate having its ends turned downwardly to provide depending flanges 32 that are secured by screws 34 to the end walls 4.

The bread or toast is held in position in the oven by means of guard wires 36, there being two such wires at each side of the opening in the top wall 14. Each guard wire is U-shaped and is applied by passing its ends downwardly through suitably arranged apertures in the supporting plate 22 and the bottom wall 16, the horizontal portion 38 of the wires extending lengthwise over the supporting plate 22. The heating elements for the toaster comprise coiled resistance wires 40, each arranged in the space between guard wires 36 and the adjacent side of the toaster and held in position by being looped over suitably arranged hooks 42 mounted on and separated by insulation 43 from the supporting plate 22 and the bottom wall 16, the ends of the two wires being suitably connected with plug terminals mounted on one of the end walls, one of the plug terminals being indicated at 44.

In accordance with my invention the sides 12 of the toaster comprise doors or closures so mounted that they may be easily removed to permit access to the interior of the toaster for repairing or cleaning purposes. As shown, each door comprises a thick pane of glass 45 which is held in a frame 46. Each frame comprises a rectangular skeleton plate of sheet metal having rearwardly bent flanges 47 within which the glass is held by lugs 48 on the flanges that are bent over the margin of the back of the glass. A lifting handle 49 is secured to the front of the lower side of the door. The lower edge of each door, when in place, rests upon the bottom 16 of the toaster, and the door is held between vertical angle irons 50 secured to the end walls of the toaster and upwardly and downwardly directed retaining flanges 51 on the longitudinal edges of the bottom 16 of the oven and the supporting plate 22, the edges of the vertical flanges of the door being arranged adjacent the angle irons 50, and the flanges 51 extending over the top and bottom of the door. Each door is of suitable height with relation to the distance between the longitudinal edges of the flanges to permit the door to be lifted by means of the handle 49 to bring its lower edge above the lower retaining flange 51 so that it may be removed.

The toaster illustrated in the drawings is also provided with novel and improved means for ejecting or raising the toast a sufficient distance through the slot in the top 14 to enable it to be easily removed. As shown, this means comprises a support 52 that normally rests upon the bottom wall 16 of the oven and is positioned between the guard wires 36 so as to support the slice of bread. This support comprises a horizontal plate having one end 53 turned upwardly a distance at right angles and arranged adjacent the rear end wall of the oven so as to constitute a guide, and its other end arranged adjacent the forward end wall so as to enable the support to be raised and lowered, the support being guided by the end walls. The central portion of the supporting plate is provided with a depending lug 54 to which is pivotally connected by means of a pin 55 the upper end of an upright link 56 having its lower end pivotally connected with the inner end of a lever 58 which is pivotally mounted at 57 on a depending lug on the top wall of the base. The outer arm of the lever 58, which is considerably shorter than the other arm, is twisted at right angles and inclined upwardly and outwardly, and is positioned directly beneath the lower end of a finger-operated plunger or push button 59. The stem of the push button is arranged to slide through a vertical bearing 60 in the top wall of the base and its lower end is provided with a head 62 which is arranged to engage the outer end of the lever 58, and is further provided with a button 64 on its upper end. The bottom plate 16 limits the downward movement of the support 52, which in turn limits the downward movement of the link 56 and the end of the lever 58 attached thereto.

With this construction it will be apparent that upon depressing the push button 64, its lower end will act through the lever 58 and link 56 to raise the support 52 and thus eject or move the toast supported thereby up through the opening 29 in the top wall of the oven, the support being moved a distance of substantially one-half the height of the oven, and the toast being thus projected a sufficient distance above the top of the oven to enable it to be easily grasped and lifted out.

During the operation of the toast support, it is held from tipping materially in a counter-clockwise direction, viewing Fig. 2, by the engagement of the guiding end portion 53 thereof with the rear end wall of the toaster oven, and in case it should tip in the opposite direction at the start of its upward movement, it will straighten out or be returned to its horizontal position during the continued upward movement thereof by the engagement of an abutment shoulder 66 formed on the upper end of the link 56 with the under side thereof. Thus, with the construction shown, the toast support may be freely raised and lowered without danger of it tipping sufficiently to cause it to bind at either end on the adjacent end wall of the oven. The arrangement of the link and lever permits the toast support to be raised the required distance with but relatively slight depression of the push button 64. Upon releasing the push button the support will immediately drop by gravity down upon the bottom wall of the oven.

As will be evident to those skilled in the art, my invention permits of various modifications without departing from the spirit thereof or the scope of the appended claims.

What I claim is:

1. An electric toaster having, in combination, a casing having its top provided with an opening through which a slice of bread may be inserted into the casing, a support mounted in the casing adapted to be moved rectilineally upward to raise the slice through said opening, a finger-operable member mounted on the casing, and suitable connections for raising said support rectilineally upward upon movement of said member in one direction and for permitting said support to drop down by gravity upon releasing said member.

2. An electric toaster having, in combination, a casing having its top provided with an opening through which a slice of bread may be inserted into the casing, a support mounted in the casing for rectilineal upward movement for raising the slice through said opening, a finger-operable plunger mounted on the casing, and suitable connections for raising said support rectilineally upward upon movement of said plunger in one direction.

3. An electric toaster having, in combination, a casing having its top provided with an opening through which a slice of bread may be inserted into the casing, a support mounted in said casing for rectilineal upward movement, a supporting base having a portion thereof projecting a distance beyond the vertical wall of the casing, a plunger mounted for vertical movement on said projecting portion of said base, and suitable connections for raising said support rectilineally upward upon said plunger being depressed and permitting said support to drop down by gravity upon said plunger being released.

4. An electric toaster having, in combination, a casing having its top provided with an opening through which a slice of bread may be placed in the casing, a support mounted for vertical movement in the casing for raising the slice through said opening, a finger-operable member mounted on the casing, and connections between said member and support for raising said support upon movement of said member in one direction comprising a lever having one end arranged beneath said support, and a vertically arranged link connecting said end of said lever with the central portion of said support.

5. An electric toaster having, in combination, a casing having its upper portion in the form of an oven having vertical sides and end walls, a bottom wall and a top wall having an opening through which a slice of bread may be positioned in the oven, a vertically movable support guided at its ends by said end walls and arranged above said bottom wall, and means for raising said support to raise the slice through said opening comprising a lever pivotally mounted beneath said bottom wall, a supporting link for said support extending through a clearance slot in said bottom wall and connecting one end of said lever with the central portion of said support, and finger-operable means accessible from the outside of the casing for turning said lever in a direction to raise said support.

6. An electric toaster having, in combination, a casing having its upper portion forming an oven having vertical side and end walls, a bottom wall and a top wall having an opening through which a slice of bread may be placed in the oven, a vertically movable support guided at its ends by said end walls and arranged above said bottom wall, a base for the oven, a manually operable plunger mounted for vertical movement in said base, a lever pivotally mounted between its ends beneath said bottom wall having one end arranged to be operatively engaged by said plunger and its other end extending beneath said bottom wall, and a link connecting the latter end of said lever with the central portion of the under side of said support and extending through a clearance slot in said bottom wall.

7. An electric toaster having, in combination, a casing having its upper portion forming an oven having vertical side and end walls, a bottom wall and a top wall having an opening through which a slice of bread may be placed in the oven, a vertically movable support guided at its ends by said end walls and arranged above said bottom wall, a base for the oven, a manually operable plunger mounted for vertical movement in said base, a lever pivotally mounted between its ends beneath said bottom wall, having one end arranged to be operatively engaged by said plunger and its other end extending beneath said bottom wall, and a link connecting the latter end of said lever with the central portion of the under side of said support and extending through a clearance slot in said bottom wall, said link having a shoulder adapted to engage said support and prevent tipping in one direction when in elevated position.

8. In an electric toaster having an oven adapted to receive a slice of bread, having vertical sides and end walls and heating elements mounted in the oven between which the slice of bread is placed, the improvement which comprises mounting at least one of the side walls so as to permit it to be removed and replaced.

9. In an electric toaster having an oven adapted to receive a slice of bread, having vertical side and end walls and heating elements mounted in the oven between which the slice of bread is placed, the improvement which comprises the provision of a door that constitutes one of the side walls of the oven, retaining members extending across said side of the oven near its upper and lower ends and extending over the outer margin of the upper and lower ends of said door, members mounted on the casing for co-operating with said retaining strips to hold the door in position, said door being of slightly greater height than the distance between the opposed edges of said retaining strip to enable the door to be lifted above the upper edge of the lower retaining strip and removed from the oven.

NELSON E. MANN.